(12) United States Patent
Boigegrain et al.

(10) Patent No.: US 9,841,093 B2
(45) Date of Patent: Dec. 12, 2017

(54) TORQUE CONVERTER WITH A FLAT ANNULAR CORE RING

(71) Applicant: Schaeffler Technologies AG & Co. KG, Herzogenaurach (DE)

(72) Inventors: Larry Chad Boigegrain, Copley, OH (US); Rolf Mueller, Wooster, OH (US); Jeremy Jewell, Wooster, OH (US); Jasmina Subotic, Wooster, OH (US); Trent Hendershot, Wooster, OH (US); Michael Resh, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 185 days.

(21) Appl. No.: 14/813,992

(22) Filed: Jul. 30, 2015

(65) Prior Publication Data

US 2017/0030450 A1 Feb. 2, 2017

(51) Int. Cl.
*F16H 41/24* (2006.01)
*F16H 41/04* (2006.01)

(52) U.S. Cl.
CPC ............ *F16H 41/04* (2013.01); *F16H 41/24* (2013.01)

(58) Field of Classification Search
CPC .......... F16H 41/04; F16H 41/28; F16H 41/00; F16H 41/26; F16H 41/06; F16H 47/06; F01D 5/02
USPC ............................ 60/330, 367, 366, 364, 365
See application file for complete search history.

(56) References Cited

U.S. PATENT DOCUMENTS

| | | | | |
|---|---|---|---|---|
| 2,462,652 A * | 2/1949 | Lysholm | ............... | F16H 41/26 60/341 |
| 2,961,830 A * | 11/1960 | Dundore | ............... | F16H 41/26 60/361 |
| 3,002,356 A * | 10/1961 | Black | ................. | F16H 41/26 60/361 |
| 3,002,593 A * | 10/1961 | Black | ................. | F16H 41/30 192/3.29 |
| 3,071,928 A * | 1/1963 | Dundore | ............... | F16H 41/26 60/337 |
| 3,110,196 A * | 11/1963 | Hilpert | ................ | F16D 25/123 192/48.618 |
| 3,125,857 A * | 3/1964 | Schneider | ............. | F16H 41/26 60/361 |
| 3,399,532 A * | 9/1968 | Fox | ..................... | F16D 33/18 415/197 |
| 3,839,864 A * | 10/1974 | Ahlen | .................. | F16H 41/04 192/3.27 |

(Continued)

*Primary Examiner* — Thomas E Lazo
*Assistant Examiner* — Dustin T Nguyen
(74) *Attorney, Agent, or Firm* — Simpson & Simpson, PLLC

(57) ABSTRACT

A torque converter, including an axis of rotation, a cover arranged to receive torque, an impeller including an impeller shell non-rotatably connected to the cover and, at least one impeller blade fixedly connected to the impeller shell, a turbine including a turbine shell and at least one turbine blade fixedly connected to the turbine shell, a stator axially disposed between the impeller and turbine shells and including at least one stator blade and a first core ring fixedly secured to the at least one impeller blade and, including at least one first flat annular surface facing the at least one turbine blade or a second core ring fixedly secured to the at least one turbine blade and, including at least one second flat annular surface facing the at least one impeller blade.

2 Claims, 9 Drawing Sheets

(56) References Cited

U.S. PATENT DOCUMENTS

| | | | | |
|---|---|---|---|---|
| 3,888,082 | A * | 6/1975 | Haide | F16H 61/50 60/361 |
| 4,155,222 | A * | 5/1979 | Ahlen | F16H 41/26 60/361 |
| 2014/0290235 | A1 * | 10/2014 | Fukunaga | F16H 47/06 60/330 |
| 2015/0377331 | A1 * | 12/2015 | Szuba | F16H 41/24 29/889.21 |

* cited by examiner

TORQUE CONVERTER WITH A FLAT ANNULAR CORE RING

TECHNICAL FIELD

The present disclosure relates to a torque converter, and more specifically, a torque converter including at least one annular core ring with flat, conical, double conical, or combination of flat and conical surfaces.

BACKGROUND

FIG. 8 is a cross-sectional view of prior art torque converter 600 including curved annular core rings. Known torque converters use a fluid medium in order to transfer torque from an engine to a transmission. Prior art torque converter 600 includes cover 601 arranged to receive torque from a crankshaft of an engine, impeller 602 and turbine 607. Impeller 602 includes impeller shell 604, blades 605, and core 614. Shell 604 is non-rotatably connected to cover 601. Impeller blade 605 is fixedly connected to impeller shell 604. Impeller core ring 614 is fixedly secured to blades 605. Turbine 607 includes turbine shell 608, blades 609, and core 614. Turbine blades 609 are fixedly connected to turbine shell 608. Stator 610 is axially disposed between impeller shell 604 and turbine shell 608 and includes stator blade 611. Core rings 614 and 616 are curved to enable continuous flow of fluid traveling between impeller 602 and turbine 607. Advances in automotive design require reducing the size, in particular the width, of torque converter components such as impeller 602 and turbine 607. However, the size reductions reduce flow area across blades 605 and 609. This reduced flow area causes inefficient flow fields within the torque converter and possibly non-continuous flow of fluid.

SUMMARY

According to aspects illustrated herein, there is provided a torque converter including: an axis of rotation; a cover arranged to receive torque; an impeller including an impeller shell non-rotatably connected to the cover and at least one impeller blade fixedly connected to the impeller shell; a turbine including a turbine shell and at least one turbine blade fixedly connected to the turbine shell; a stator axially disposed between the impeller and turbine shells and including at least one stator blade; and a first core ring fixedly secured to the at least one impeller blade and including at least one first flat annular surface facing the at least one turbine blade, or a second core ring fixedly secured to the at least one turbine blade and including at least one second flat annular surface facing the at least one impeller blade. A flat surface is represented by a straight line in a cross-section formed by a plane parallel to and passing through the axis of rotation.

According to aspects illustrated herein, there is provided a torque converter, including: an axis of rotation; a cover arranged to receive torque; an impeller including an impeller shell non-rotatably connected to the cover and at least one impeller blade fixedly connected to the impeller shell; a turbine including a turbine shell and at least one turbine blade fixedly connected to the turbine shell; a stator axially disposed between the impeller and turbine shells and including at least one stator blade; and a first core ring fixedly secured to the at least one impeller blade and, including a first flat annular surface orthogonal to an axis of rotation, or a second core ring fixedly secured to the at least one turbine blade and including a second flat annular surface orthogonal to the axis of rotation. A flat surface is represented by a straight line in a cross-section formed by a plane parallel to and passing through the axis of rotation.

According to aspects illustrated herein, there is provided a torque converter, including: an axis of rotation; a cover arranged to receive torque; an impeller including an impeller shell non-rotatably connected to the cover and at least one impeller blade fixedly connected to the impeller shell; a turbine including a turbine shell and at least one turbine blade fixedly connected to the turbine shell; a stator axially disposed between the impeller and turbine shells and including at least one stator blade; and a first core ring fixedly secured to the at least one impeller blade and including at least one first flat annular surface at an acute angle with respect to a first line orthogonal to an axis of rotation, or a second core ring fixedly secured to the at least one turbine blade and including at least one second flat annular surface at an acute angle with respect to a second line orthogonal to the axis of rotation. A flat surface is represented by a straight line in a cross-section formed by a plane parallel to and passing through the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
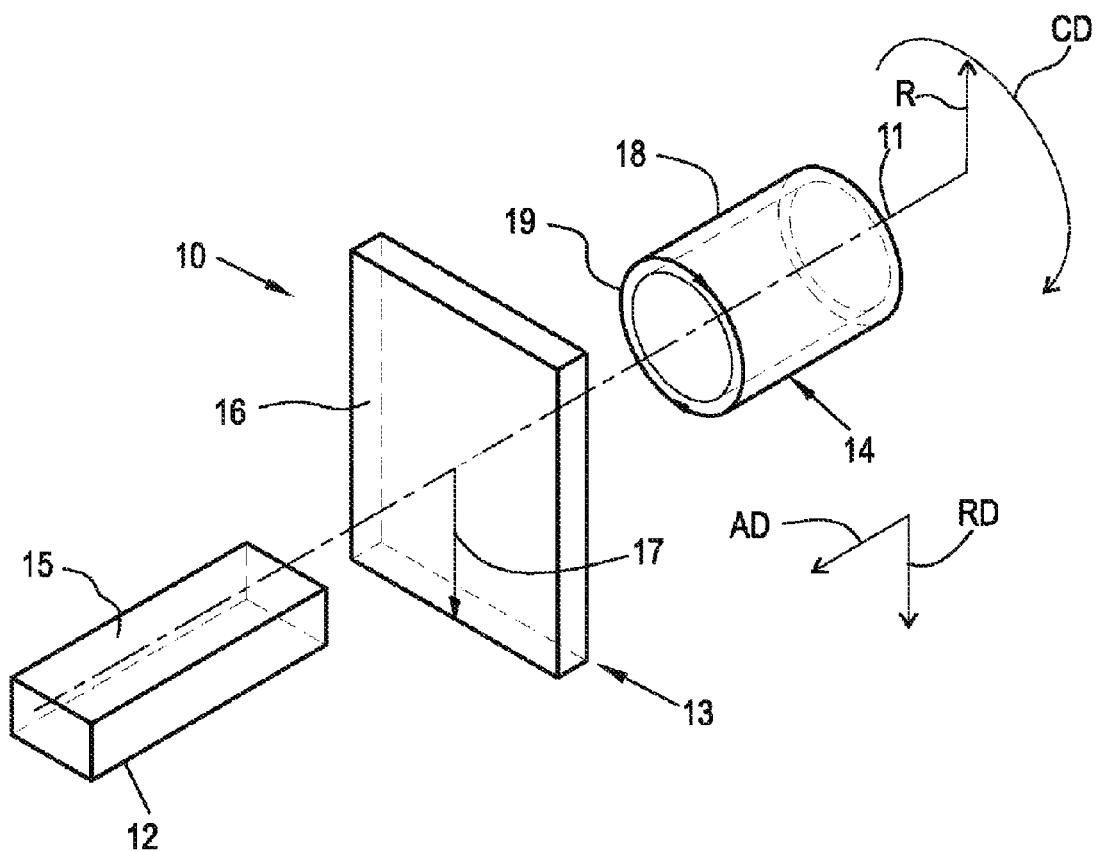
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

The discussion that follows is directed to torque converters including: a respective turbine core ring with flat and/or conical surfaces; and a respective impeller core ring with flat and/or conical surfaces. However, it should be understood that a torque converter can include only one of the respective turbine core ring with the flat and/or conical surfaces, or the respective impeller core ring with the flat and/or conical surfaces.

Figure 2:
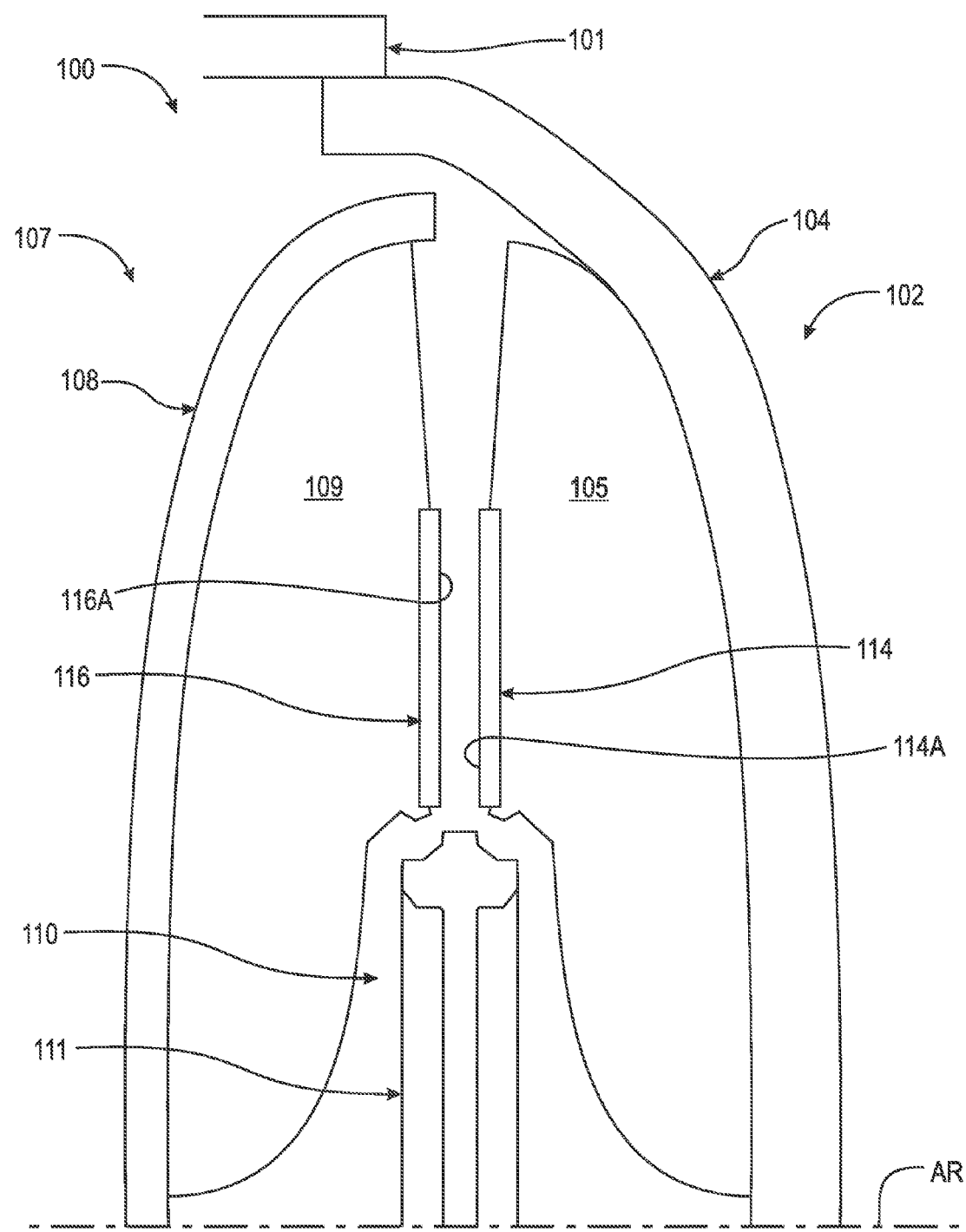
FIG. 2 is a cross-sectional view of a torque converter including flat core rings.
Figure 7:
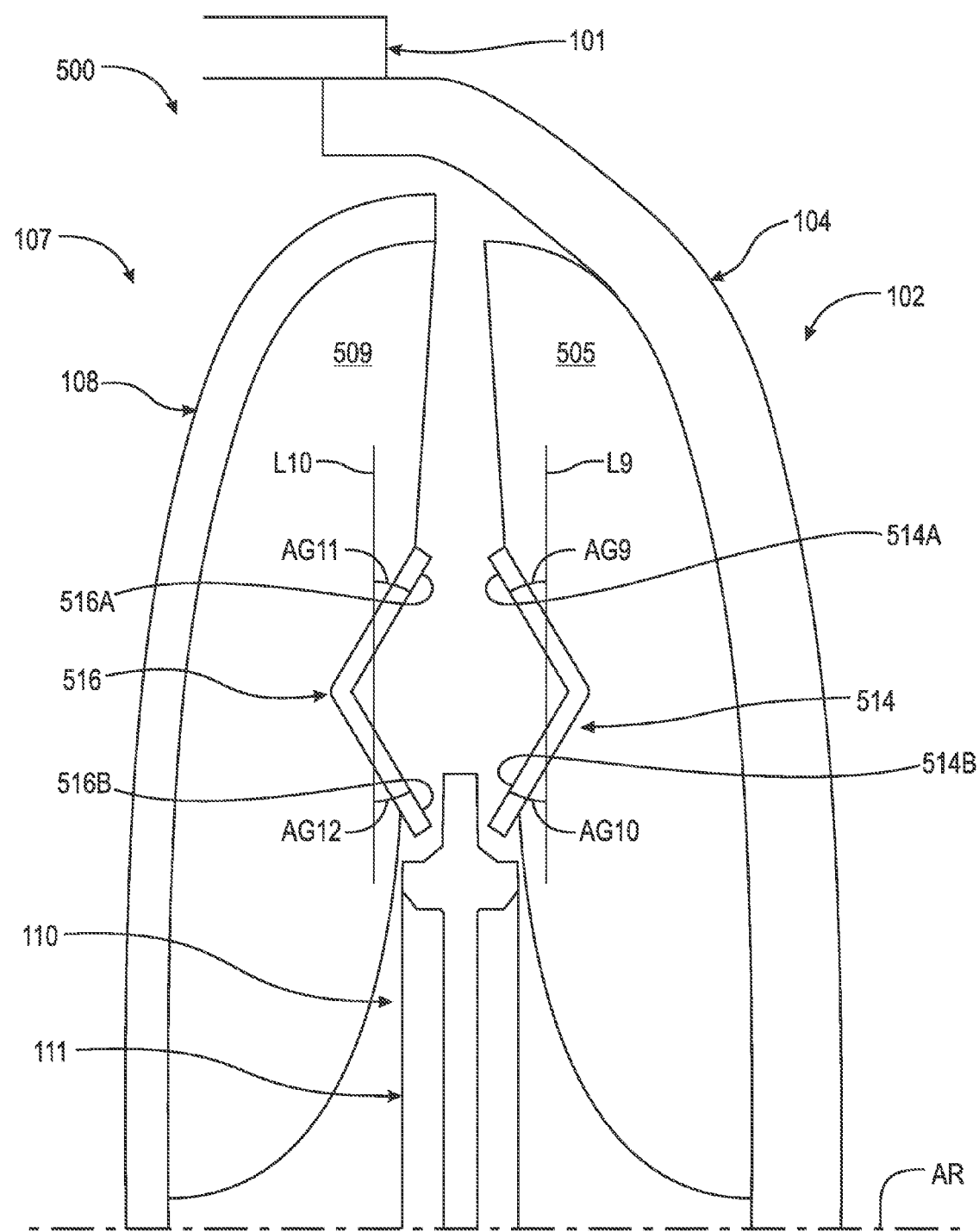
FIG. 7 is a cross-sectional view of a torque converter including double conical core rings; and, FIG. 8 is a cross-sectional view of a prior art torque converter including curved annular core rings.
Figure 8:
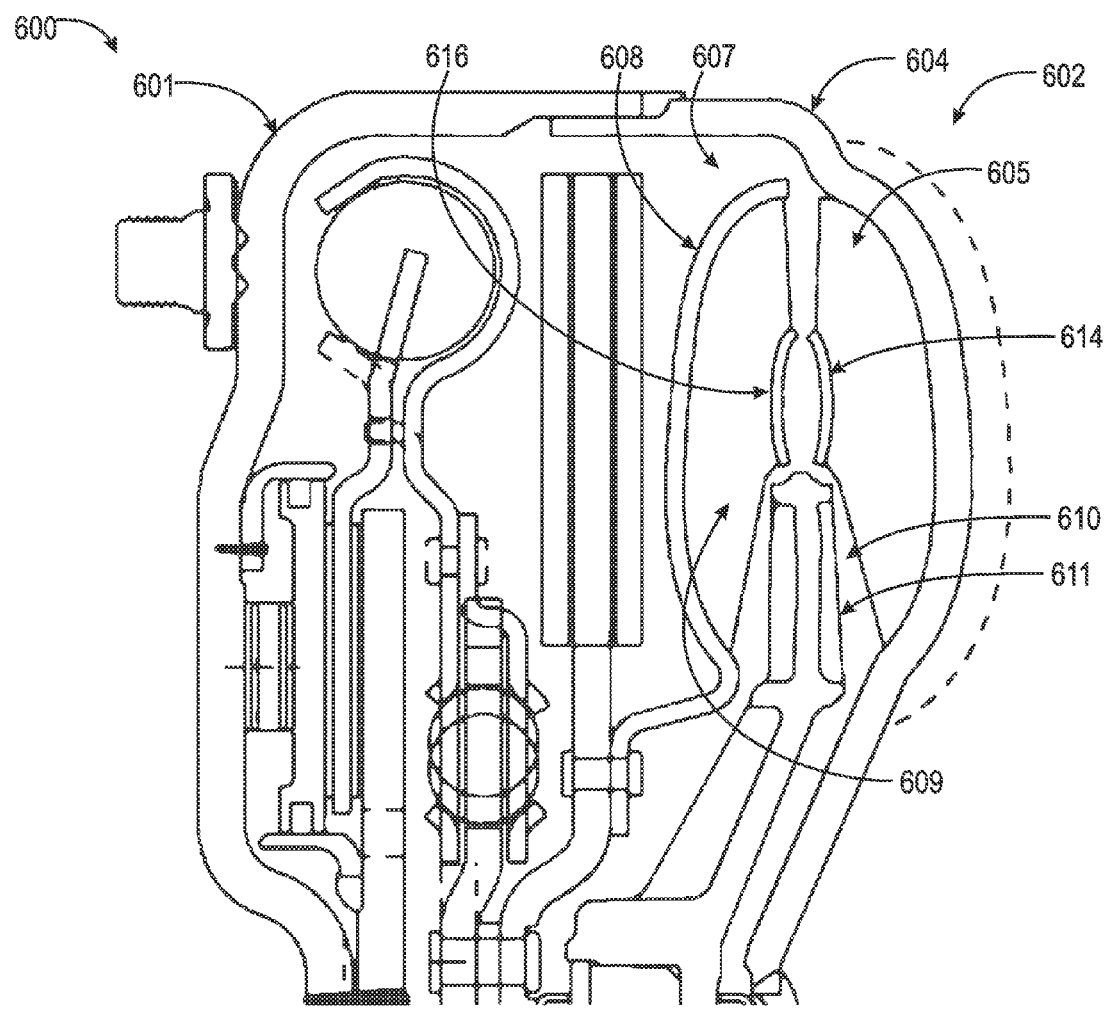

FIG. 2 is a cross-sectional view of torque converter 100 including flat core rings. Torque converter 100 includes axis of rotation AR, cover 101 arranged to receive torque, impeller 102 with impeller shell 104 non-rotatably connected to the cover, and at least one blade 105 fixedly connected to impeller shell 104. Torque converter 100 includes turbine 107 including turbine shell 108, and at least one blade 109 fixedly connected to turbine shell 108. Stator 110 is axially disposed between impeller shell 104 and turbine shell 108 and includes at least one stator blade 111. Torque converter 100 includes core ring 114 and core ring 116. Core ring 114 is fixedly secured to blade 105 and includes flat annular surface 114A facing blade 109. Core ring 116 is fixedly secured to blade 109 and includes flat annular surface 116A facing blade 105. Surfaces 114A and 116A are also orthogonal to axis of rotation AR. Surfaces 114A and 116A are orthogonal to axis of rotation AR. By "flat surface" we mean a surface that is represented by a straight line in an cross-section formed by a plane parallel to and passing through an axis of rotation, for example as shown in FIG. 2. When a flat surface is at an acute angle with respect to line orthogonal to the axis, for example as shown in FIG. 7, the flat surface is a conical surface.

Figure 3:
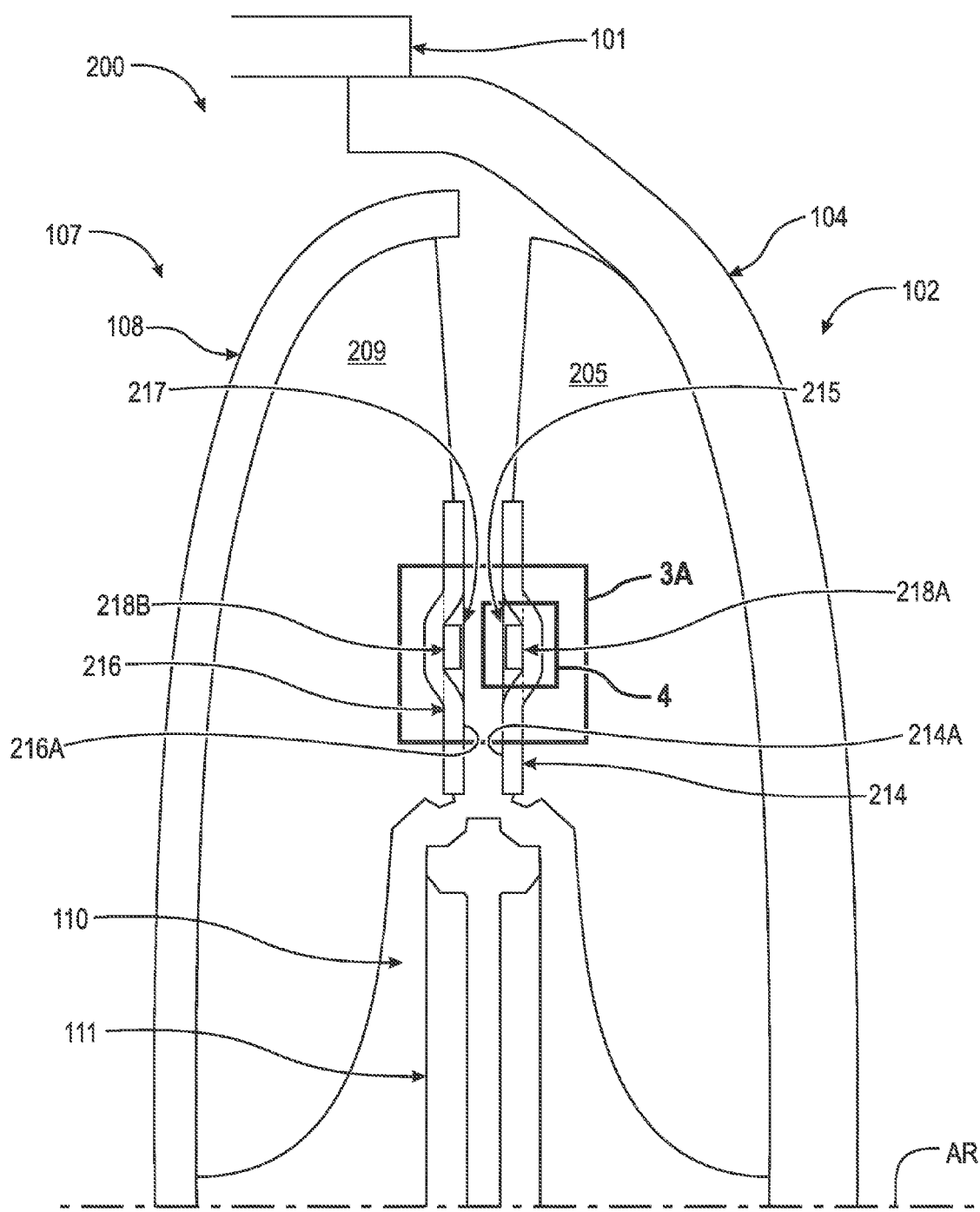
FIG. 3 is a cross-sectional view of a torque converter including flat core rings.

FIG. 3 is a cross-sectional view of torque converter 200 with flat core rings. Torque converter 200 includes axis of rotation AR, cover 101 arranged to receive torque, impeller 102 with impeller shell 104 non-rotatably connected to the cover and at least one blade 205 fixedly connected to impeller shell 104. Torque converter 100 includes turbine 107 including turbine shell 108 and at least one blade 209 fixedly connected to turbine shell 108. Stator 110 is axially disposed between impeller shell 104 and turbine shell 108 and includes at least one stator blade 111. Torque converter 100 includes core ring 214 and core ring 216. Core ring 214 is fixedly secured to blade 205 and includes recess 215 disposed in surface 214A and facing blade 209. Core ring 216 is fixedly secured to blade 209 and includes recess 217 disposed in surface 216A and facing blade 205. Surfaces 214A and 216A are flat and orthogonal to axis AR.

Figure 3A:
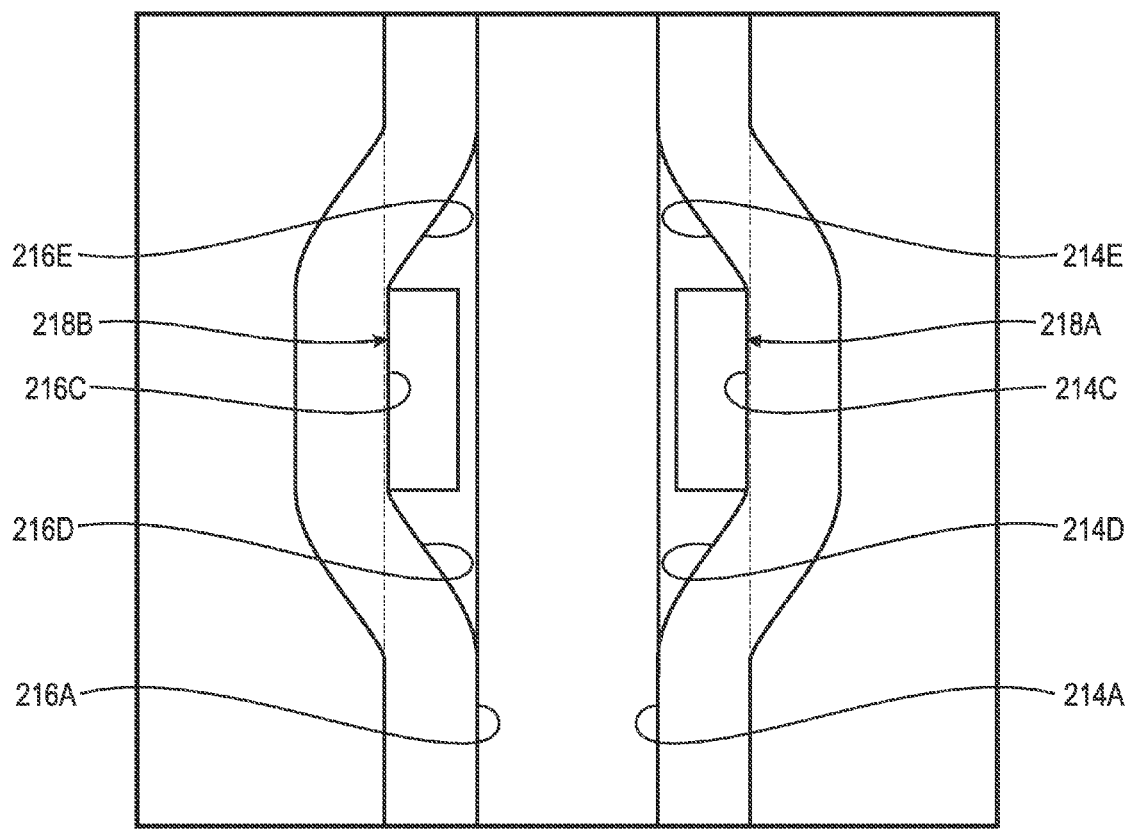
FIG. 3A is a detail of area 3A in FIG. 3.

FIG. 3A is a detail of area 3A in FIG. 3.

Figure 4:
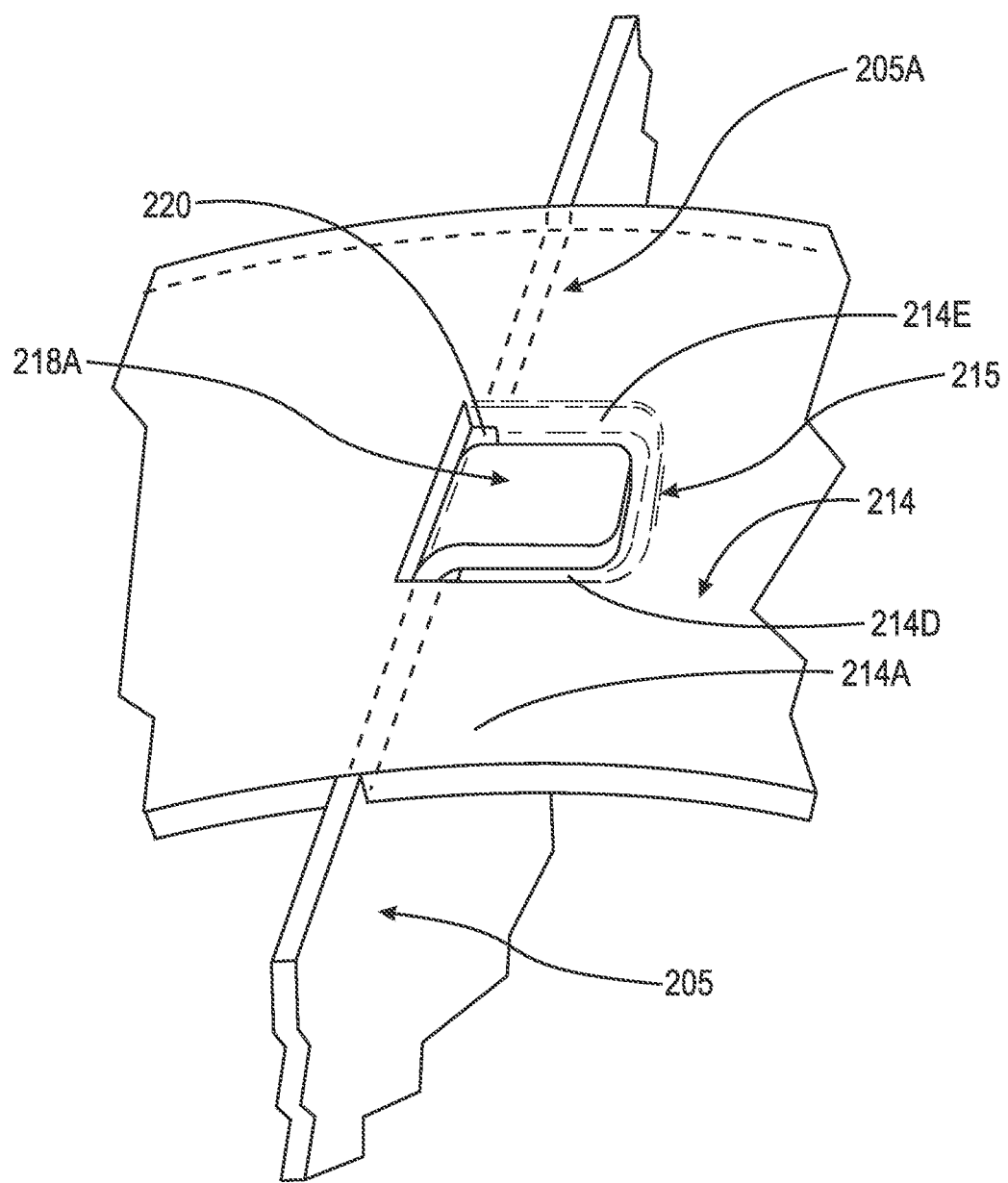
FIG. 4 is a detail of portion 4 in FIG. 3.

FIG. 4 is a detail of area 4 in FIG. 3. Recess 215 is partially formed by surfaces 214C, 214D and 214E. Recess 217 is partially formed by surfaces 216C, 216D and 216E. In order to center and arrange core ring 214 on blade 205, blade 205 includes cut 205A which core ring 214 rests within. Blade 205 also includes tab 218A which passes through aperture 220 of core ring 214. Tab 218A is deformed in order to secure core ring 214 to blade 205. In order to keep surface 214A without protrusions toward the turbine core, core ring 214 includes recess 215 which allows tab 218A, when deformed, to be flush with surface 214A. The discussion regarding blade 205 and tab 218A is applicable to blade 209 and tab 218B.

Figure 5:
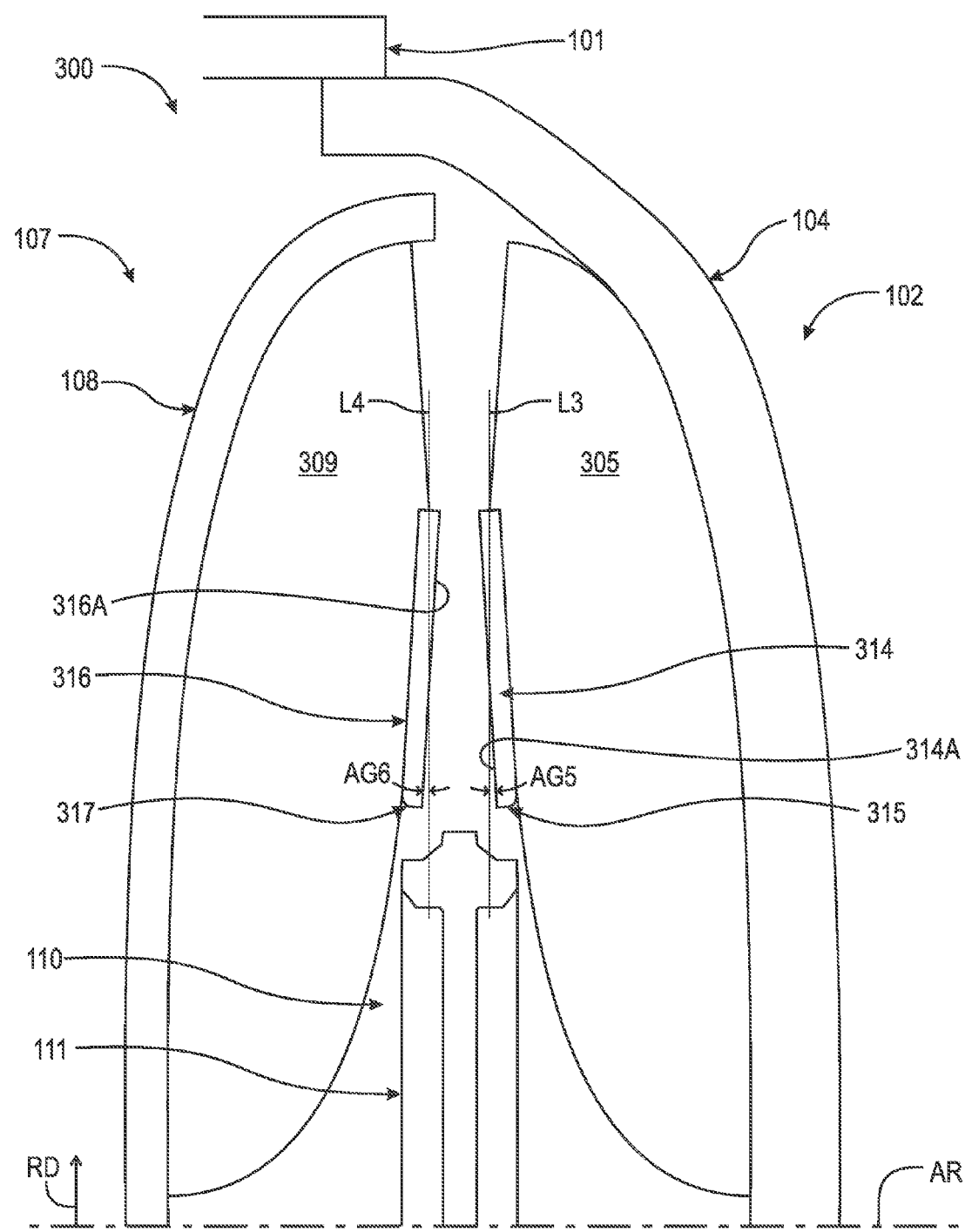
FIG. 5 is a cross-sectional view of a torque converter including conical core rings.

FIG. 5 is a cross-sectional view of torque converter 300 with conical core rings. Torque converter 300 includes cover 101 arranged to receive torque, impeller 102 which includes impeller shell 104 non-rotatably connected to the cover and, blade 305 fixedly connected to impeller shell 104. Torque converter 100 also includes turbine 107 including turbine shell 108 and blade 309 fixedly connected to turbine shell 108. Stator 110 is axially disposed between impeller shell 104 and turbine shell 108 and includes stator blade 111. Torque converter 300 includes core ring 314 and core ring 316. Core ring 314 is fixedly secured to blade 305 and includes surface 314A facing blade 309. Core ring 316 is fixedly secured to blade 309 and includes surface 316A facing blade 305.

Surface 314A and surface 316A are conical surfaces. Surfaces 314A and 316A are arranged at acute angles AG5 and AG6, respectively, with respect to lines L3 and L4, respectively, orthogonal to axis of rotation AR. In an example embodiment, angles AG5 and AG6 are equal. In an example embodiment, angles AG5 and AG6 are not equal. In order to increase the flow efficiency within torque converter 300, core rings 314 and 316 include edge breaks 315 and 317, respectively. Surfaces 314A and 316A taper toward each other in radially outward direction RD.

Figure 6:
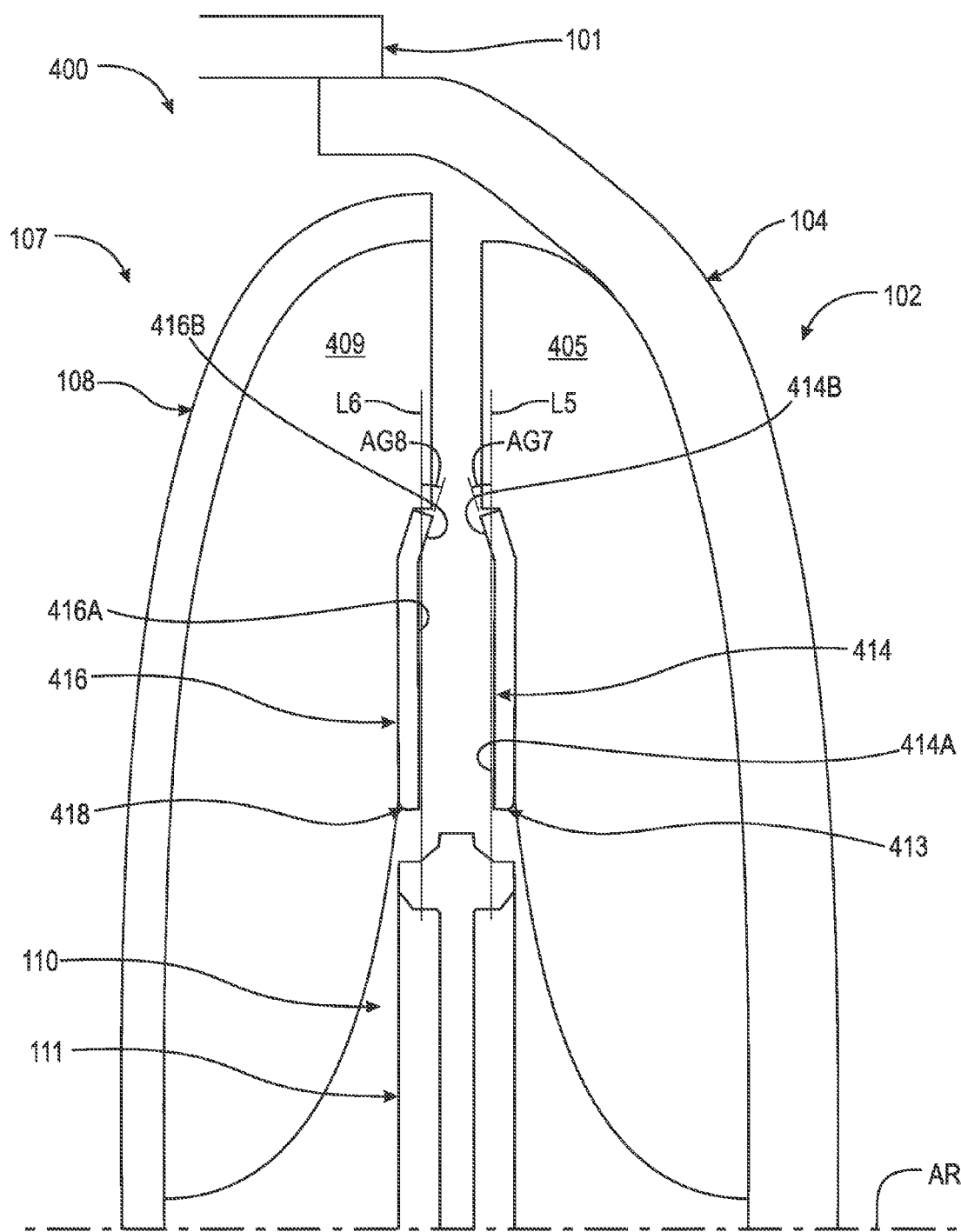
FIG. 6 is a cross-sectional view of a torque converter including flat core rings with conical portions.

FIG. 6 is a cross-sectional view of torque converter 400 with flat core rings including conical portions. Torque converter 400 includes cover 101 arranged to receive torque, impeller 102 which includes impeller shell 104 non-rotatably connected to the cover and, blade 405 fixedly connected to impeller shell 104. Torque converter 400 also includes turbine 107 including turbine shell 108 and blade 409 fixedly connected to turbine shell 108. Stator 110 is axially disposed between impeller shell 104 and turbine shell 108 and includes stator blade 111. Torque converter 400 includes core ring 414 and core ring 416. Core ring 414 is fixedly secured to blade 405 and includes surfaces 414A and 414B facing blade 409. Core ring 416 is fixedly secured to blade 409 and includes surfaces 416A and 416B facing blade 405. Surface 414A and 416A are flat annular surfaces. Surfaces 414B and 416B are conical surfaces. Surfaces 414A and 416A are orthogonal to axis of rotation AR. Surfaces 414B and 416B are arranged at acute angles AG7 and AG8 with respect to lines L5 and L6, respectively, orthogonal to axis of rotation AR. In an example embodiment, angles AG7 and AG8 are equal. In an example embodiment, angles AG7 and AG8 are not equal. In order to increase the flow efficiency within torque converter 400, core rings 414 and 416 includes edge breaks 413 and 418, respectively.

FIG. 7 is a cross-sectional view of torque converter 500 with double conical core rings. Torque converter 500 includes cover 101 arranged to receive torque, impeller 102 which includes impeller shell 104 non-rotatably connected to the cover, and blade 505 fixedly connected to impeller shell 104. Torque converter 500 includes turbine 107 including turbine shell 108 and blade 509 fixedly connected to turbine shell 108. Stator 110 is axially disposed between impeller shell 104 and turbine shell 108 and includes stator blade 111. Torque converter 500 includes core ring 514 and core ring 516. Core ring 514 is fixedly secured to blade 505 and includes surfaces 514A and 514B facing blade 509. Core ring 516 is fixedly secured to blade 509 and includes surfaces 516A and 516B facing blade 505.

Surfaces 514A and 514B are arranged at acute angles AG9 and AG10, respectively, with respect to line L9 orthogonal to axis of rotation AR. Surfaces 516A and 516B are arranged at an acute angles AG11 and AG12, respectively, with respect line L10 orthogonal to axis AR. In an example embodiment, angles AG9 and AG10 are equal. In an example embodiment, angles AG11 and AG12 are equal. In an example embodiment, angles AG9, AG10, AG11, and AG12 are equal. In an example embodiment, angles AG9 and AG10 are not equal. In an example embodiment, angles AG11 and AG12 are not equal. In an example embodiment, some or all of angles AG9, AG10, AG11, and AG12 are not equal.

Although torque converters 100 through 500 are shown with matching, symmetrical turbine and impeller core rings, it should be understood that the configurations of turbine and impeller core rings shown for torque converters 100 through 500 can be mixed within a particular torque converter. For example, impeller core ring 114 can be used in torque converters 200 through 500 while maintaining the respective turbine core rings shown for those torque converters. For example, turbine core ring 216 can be used in torque converters 100 and 300 through 500 while maintaining the respective impeller core rings shown for those torque converters.

Advantageously, the addition of flat, and in some instances conical, core rings increases the available flow area across the blades of a torque converter. The increase in available flow area enables a torque converter having a reduced width to maintain operating efficiency. Additionally, a flat or conical core ring simplifies the stamping process used to manufacture the core ring, since a flat or core ring does not require an additional step to form a curve in the core ring.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
   an axis of rotation;
   a cover arranged to receive torque;
   an impeller including:
   an impeller shell non-rotatably connected to the cover; and,
   at least one impeller blade fixedly connected to the impeller shell;
   a turbine including a turbine shell and at least one turbine blade fixedly connected to the turbine shell;
   a stator axially disposed between the impeller and turbine shells and including at least one stator blade;
   a first core ring or a second core ring,
   the first core ring fixedly secured to the at least one impeller blade; and, including at least one first flat annular surface facing the at least one turbine blade;
   the second core ring fixedly secured to the at least one turbine blade and, including at least one second flat annular surface facing the at least one impeller blade, wherein a flat surface is represented by a straight line in a cross-section formed by a plane parallel to and passing through the axis of rotation,
   wherein the at least one first flat annular surface includes first and second surfaces orthogonal to the axis of rotation; the first core ring includes a first recess radially disposed between the first and second surfaces; and, the impeller blade includes a first tab passing through the first core ring and at least partially disposed within the first recess; or,
   the at least one second flat annular surface includes third and fourth surfaces orthogonal to the axis of rotation; the second core ring includes a second recess radially disposed between the third and fourth surfaces; and, the turbine blade includes a second tab passing through the second core ring and at least partially disposed within the second recess.

2. A torque converter, comprising:
   an axis of rotation;
   a cover arranged to receive torque;
   an impeller including:
   an impeller shell non-rotatably connected to the cover; and,
   at least one impeller blade fixedly connected to the impeller shell;
   a turbine including a turbine shell and at least one turbine blade fixedly connected to the turbine shell;
   a stator axially disposed between the impeller and turbine shells and including at least one stator blade;
   a first core ring or a second core ring
   the first core ring fixedly secured to the at least one impeller blade; and, including at least one first flat annular surface orthogonal to the axis of rotation; or,
   the second core ring fixedly secured to the at least one turbine blade; and, including at least one second flat annular surface orthogonal to the axis of rotation, wherein a flat surface is represented by a straight line in a cross-section formed by a plane parallel to and passing through the axis of rotation,
   wherein the at least one first flat annular surface orthogonal to the axis of rotation includes third and fourth flat annular surfaces orthogonal to the axis of rotation; the first core ring includes a first recess radially disposed between the third and fourth flat annular surfaces; and, the impeller blade includes a first tab passing through the first core ring and at least partially disposed within the first recess; or,
   the at least one second flat annular surface orthogonal to the axis of rotation includes fifth and sixth flat annular surfaces orthogonal to the axis of rotation; the second core ring includes a second recess radially disposed between the fifth and sixth flat annular surfaces; and, the turbine blade includes a second tab passing through the second core ring and at least partially disposed within the second recess.

\* \* \* \* \*